US006925160B1

(12) United States Patent
Stevens et al.

(10) Patent No.: US 6,925,160 B1
(45) Date of Patent: Aug. 2, 2005

(54) SYSTEM AND METHOD FOR MANAGING CELLULAR TELEPHONE ACCOUNTS

(75) Inventors: Lane E. Stevens, Alpine, UT (US); David I. Stevens, Agoura Hills, CA (US)

(73) Assignee: MobileSense Technologies, Inc., Westlake Village, CA (US)

( * ) Notice: Subject to any disclaimer, the term of this patent is extended or adjusted under 35 U.S.C. 154(b) by 154 days.

(21) Appl. No.: 10/644,773

(22) Filed: Aug. 21, 2003

Related U.S. Application Data

(60) Provisional application No. 60/404,748, filed on Aug. 21, 2002.

(51) Int. Cl.[7] ...................... H04M 15/00; H04M 11/00; G06F 17/60
(52) U.S. Cl. ........................... 379/121.05; 379/114.03; 379/126; 379/127.03; 379/127.05; 455/406; 705/52; 705/34
(58) Field of Search ...................... 379/114.01, 114.03, 379/114.05, 121.01, 121.03, 121.05, 122, 379/126, 127.03, 127.05, 135, 136; 455/405, 455/406, 407, 408; 705/52, 34

(56) References Cited

U.S. PATENT DOCUMENTS

| | | | | |
|---|---|---|---|---|
| 4,979,207 A | * | 12/1990 | Baum et al. ............ | 379/114.01 |
| 5,425,087 A | * | 6/1995 | Gerber et al. ............... | 379/134 |
| 5,842,174 A | * | 11/1998 | Yanor ............................ | 705/1 |
| 5,898,918 A | * | 4/1999 | Leppanen ................ | 455/414.1 |
| 5,943,406 A | * | 8/1999 | Leta et al. ................... | 379/120 |
| 6,256,515 B1 | * | 7/2001 | Cox et al. ................... | 455/565 |
| 6,282,274 B1 | * | 8/2001 | Jain et al. .............. | 379/114.26 |
| 6,304,857 B1 | * | 10/2001 | Heindel et al. ............... | 705/34 |
| 6,373,934 B2 | * | 4/2002 | Jensen ........................ | 379/140 |

* cited by examiner

*Primary Examiner*—Quoc Tran
(74) *Attorney, Agent, or Firm*—Pillsbury Winthrop

(57) ABSTRACT

A computer implemented system and method of allocating costs of wireless telephone usage. Billing and usage information is received from at least one wireless telephone service provider related to calls made and received by a plurality of wireless telephone service users. Each call is automatically categorized as a business call or a personal call based on at least one of a phone book, time of day, day, and preset flag associated with a given telephone number. A categorization policy may also be applied in the event call categorization cannot be completed. The categorized calls can be reviewed via a graphical user interface and modification of a categorization can be effected. A final categorization of the calls is ultimately approved, which then allows charges to be appropriately allocated to users, and/or to/from a pool of available wireless time.

26 Claims, 12 Drawing Sheets

FIG. 1

Corporate Cellular Expense Tracking mobilsense

| My Acct Summary | My Acct Details | Phone Book | Settings | Management | Profiles | Employee | Reports | Help | Lc Welcome
Mike Lee
714-264-8844

Phone Book

○ Business  ○ Personal  ● All  ~210

Phone Book List

| Number | Name | Company | Book |
|---|---|---|---|
| 214-244-3050 | Mobile Adams, Rhonda | | P |
| 972-840-1310 | Mobile Aguillara, Terry | | B |
| 818-524-7601 | Mobile Alatorre, Jose | | B |
| 818-324-4016 | Mobile Allred, Aaron | | B |
| 801-918-8364 | Mobile Arlotti, Horatio | | P |
| 805-701-1603 | Mobile Baja, Kasey | | B |
| 818-524-4014 | Mobile Bauwen, Liz | | B |
| 408-585-1766 | Mobile Beck, Lauren | | B |
| 805-455-7269 | Mobile Bell, Larry | | B |
| 805-718-1544 | Mobile Bhanbari, Aristotle | | P |
| 805-324-7223 | Mobile Bingo, Harriet | | B |
| 818-824-4019 | Mobile Bisente, George | | |
| 408-649-9908 | Mobile Bonderon, Joey | | |
| 214-912-7498 | Mobile Bondock, AE Brick | | |

Showing 1 - 14 out of 170      ~202

[Add New Number] ~206      [Delete Number] ~208

Edit Detail  ~204

Phone Number:          Phone Type:
[214-244-3050]         [Mobile]

Last Name:
[Adams]

First Name:
[Rhonda]

Company/Description:
[                    ]

Phone Book Category:   Business Travel
[Personal]             ☐

[Save]      [Reset]

FIG. 2

Corporate Cellular Expense Tracking mobilsense

| My Acct Summary | My Acct Details | Phone Book | Settings | Management | Profiles | Employee | Reports | Help | Lo Sign Up Welcome
Mike Lee
714-264-8844

Phone Book

○ Business    ○ Personal    ● All

Phone Book List

| Number | Name | Company | Book |
|---|---|---|---|
| 214-244-3050 | Mobile Adams, Rhonda | | P |
| 972-840-1310 | Mobile Aguillara, Terry | | B |
| 818-524-7601 | Mobile Alatorre, Jose | | B |
| 818-324-4016 | Mobile Allred, Aaron | | B |
| 801-918-8364 | Mobile Arlotti, Horatio | | P |
| 805-701-1603 | Mobile Baja, Kasey | | B |
| 818-524-4014 | Mobile Bauwen, Liz | | B |
| 408-585-1766 | Mobile Beck, Lauren | | B |
| 805-455-7269 | Mobile Bell, Larry | | B |
| 805-718-1544 | Mobile Bhanbari, Aristotle | | B |
| 805-324-7223 | Mobile Bingo, Harriet | | P |
| 818-824-4019 | Mobile Bisente, George | | B |
| 408-649-9908 | Mobile Bonderon, Joey | | B |
| 214-912-7498 | Mobile Bondock, AE Brick | | B |

Showing 1 - 14 out of 170

[Add New Number]  [Delete Number]

Edit Detail

Phone Number: 214-244-3050    Phone Type: Mobile

Last Name: Adams

First Name: Rhonda

Company/Description:

Phone Book Category: Personal    Business Travel: ☐

[Save]    [Reset]

FIG. 5

Corporate Cellular Expense Tracking mobilsense

Welcome
Mike Lee
714-264-8844

| My Acct Summary | My Acct Details | Phone Book | Settings | Management | Profiles | Employee | Reports | Help |

Employee

Manager: [Lee, Mike] — 606

Employee List — 602

| Phone Number | Employee Name | Manager Name | Profile |
|---|---|---|---|
| 805-207-0915 | Abramson, Cynthia | Lee, Mike | Sales Management |
| 801-718-0108 | Corry, Erin | Lee, Mike | Sales Management |
| 972-489-1440 | Grant, Timothy | Lee, Mike | Sales Management |
| 214-806-4389 | Winterthorpe, George | Lee, Mike | Sales Management |

Showing 1 - 4 out of 4

Edit Detail — 604

| Last Name: [Abramson] | First Name: [Cynthia] | | |
|---|---|---|---|
| Phone Number: [8052070915] | | | |
| Co: [002] | Div: [200] | Dept: [0109] | Emp: [None] |
| Email Address: [None] | | | |
| Manager Name: [Lee, Mike] | | | |
| Profile: [Sales Management] | | | |

[Save] [Reset]

Fig. 6

Corporate Cellular Expense Tracking mobilsense>>>

| My Acct Summary | My Acct Details | Phone Book | Settings | Management | Profiles | Employee | Reports | Help | Lo Welcome
Mike Lee
714-264-8844

Management

Manager: Lee, Mike ~706

~702

☐ Select All ~716

| Approve | Employee Name | Profile | Pers Total | Bus Total | Grand Total | Status | Manager Name | Edit |
|---------|---------------|---------|------------|-----------|-------------|--------|--------------|------|
| ☐ | Abramson, Cynthia | Sales Management | 0.00 | 10.42 | 10.42 | Viewed | Lee, Mike | Edit |
| | Corry, Erin | Sales Management | 13.75 | 19.55 | 33.30 | | Lee, Mike | Edit |
| ☐ | Grant, Timothy | Sales Management | 3.33 | 12.36 | 15.69 | | Lee, Mike | Edit |
| | Winterthorpe, George | Sales Management | 9.55 | 12.20 | 21.75 | | Lee, Mike | Edit |

26.63  54.53  81.16

Submit for Processing ~714

Showing 1 - 4 out of 4

Statement summary for: Abramson, Cynthia ~704

| | Personal | Business |
|---|----------|----------|
| Original Total | $0.00 | $10.42 |
| Travel Overrides | $0.00 | $0.00 |
| Vacation Overrides | $0.00 | $0.00 |
| Other Overrides | $0.00 | $0.00 |
| Net Change | $0.00 | $0.00 |
| % Change | 0.0% | 0.0% |
| New Total | $0.00 | $10.42 |

| Plan Minutes | Minute Delta | Airtime Charge | Rm/LD Charge |
|--------------|--------------|----------------|--------------|
| 0 | 58 | 10.42 | 0.00 |

FIG. 7

Corporate Cellular Expense Tracking — mobilsense

| My Acct Summary | My Acct Details | Phone Book | Settings | Management | Profiles | Employee | Reports | Help |

Management Reports

Welcome
Mike Lee
714-264-8844

Date: December 2001   Reports: Individual Detail   [Print]

828  830  832  834                                                      808  812  814  816  818  820  822  824  826
All   All   All   Manager: All

| Company | Division | Department | Manager | Employee | Carrier | Total $ | Airtime $ | Roam $ | LD $ | UCPM $ | Total Minutes | Minutes Over/Under | Plan Type |
|---|---|---|---|---|---|---|---|---|---|---|---|---|---|
| 002 | 200 | 0109 | Lee, Mike | Abramson, Cynthia | Nextel | $32.42 | $10.42 | $0.00 | $0.00 | $0.56 | 58 | 58 | XHA |
| 002 | 200 | 0109 | | Corry, Erin | Verizon | $28.45 | $18.82 | $0.00 | $0.15 | $0.26 | 108 | 8 | |
| 002 | 200 | 0109 | | Grant, Timothy | ATT | $71.70 | $0.00 | $0.00 | $0.00 | $0.61 | 118 | -332 | |
| 002 | 200 | 0109 | | Winterthorpe, George | ATT | $56.61 | $7.84 | $0.00 | $0.00 | $0.37 | 153 | -197 | |
| | | | | | | $189.18 | $37.08 | $0.00 | $0.15 | $0.43 | 437.0 | 595.0 | |
| 149 | 000 | 0938 | | Lee, Mike | ATT | $131.86 | $54.90 | $0.00 | $9.00 | $0.15 | 873 | 373 | |
| | | | | | | $131.86 | $54.90 | $0.00 | $9.00 | $0.15 | 873.0 | 373.0 | |
| Grand Totals | | | | Count: 5 | | $321.04 | $91.98 | | $9.15 | $0.25 | 1310 | | |

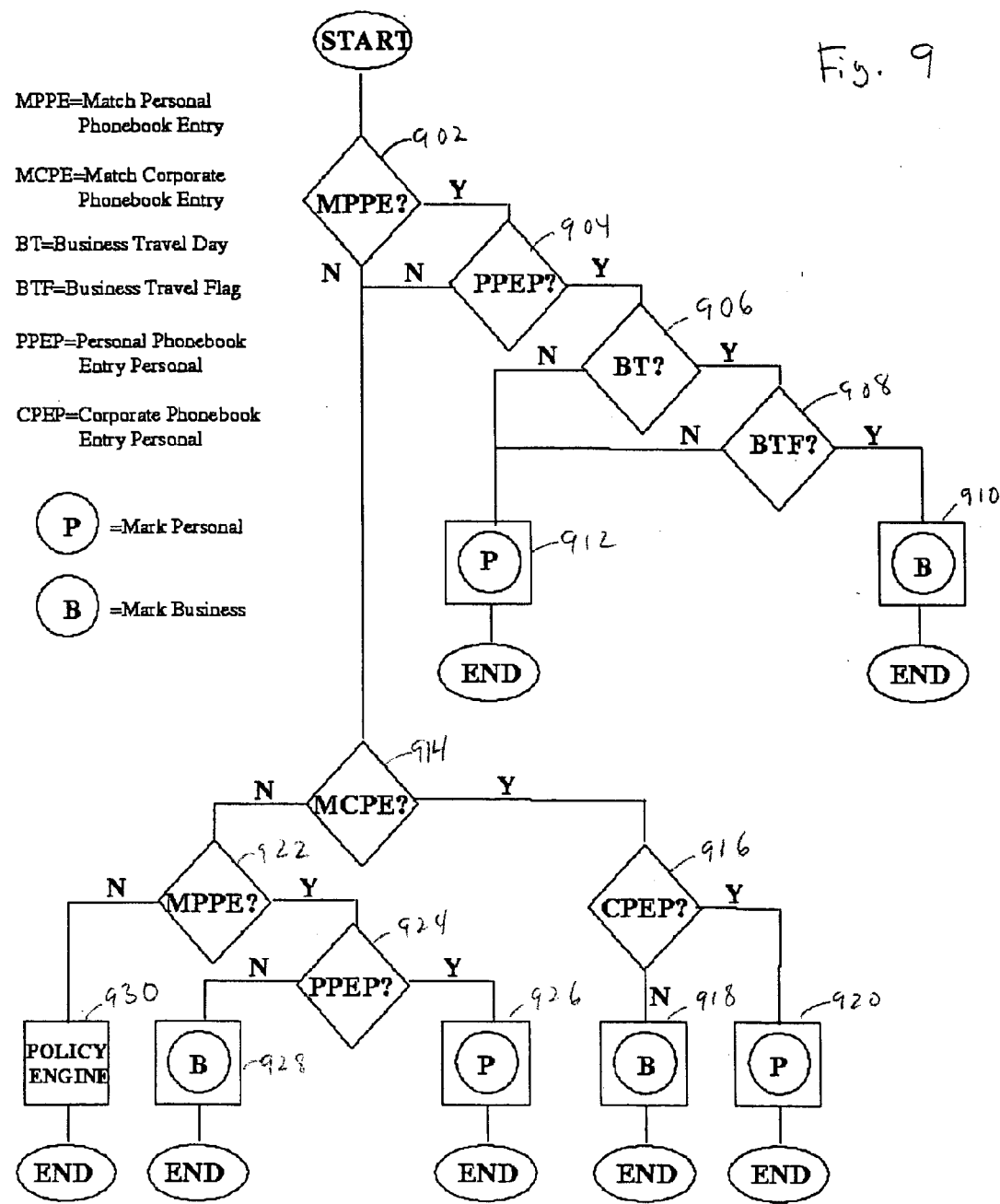

SYSTEM AND METHOD FOR MANAGING CELLULAR TELEPHONE ACCOUNTS

This application claims the benefit of U.S. Provisional Application No. 60/404,748, filed Aug. 21, 2002, which is herein incorporated by reference in its entirety.

BACKGROUND

1. Field of the Invention

The present invention relates to a system and method for managing cellular telephone accounts and bills.

2. Background of the Invention

Today many companies require employees to review paper statements, highlight personal calls, and submit a check to reimburse the company for personal calls made.

Many other companies manually audit, retrospectively, the call history of their employees to determine a percentage of the total phone bill attributable to personal calls and business calls. These companies often then set this percentage, applying it to a current month even if it is not accurate for that current month. This system often is inaccurate. For example, if the company applies a fixed percentage of a current month's bill (determined by analyzing the employee prior bills, such as the last three month's bills) as personal, and thus owed by the employee, but this month the employee made many fewer personal calls than during the last three months, the percentage set by the company will be too high. Thus, the company will be requiring the employee to pay more of the bill than it should.

To aid companies in their analysis of employee phone bills, many cell phone carriers provide data and related software to companies, usually on computer disc. This data and software allows a company to "cut and slice" certain phone calls made by an employee, so long as the calls were made on the phone services provided by the particular carrier.

Many of these carriers, however, do not provide such data and software to smaller companies.

In view of the foregoing, there is a need for better tools and management techniques for controlling and monitoring employee cellular telephone usage on an employer-supplied telephone.

BRIEF SUMMARY OF THE INVENTION

The present invention is directed to a system and method for assisting businesses in managing phone accounts. The present invention also is directed to a system and method permitting businesses to view and manage accounts for multiple phone service carriers.

In an exemplary embodiment, the present invention allows a business to automatically allocate and recapture payments from employees for such employees' personal use of a cell phone or reimburse employees for business use charges on employee-liable cell phones.

In another exemplary embodiment, the present invention includes an automated rules engine for determining whether phone calls made by an employee are for a business or personal purpose. This rules engine automatically places every employee phone call in a business or personal use category and assigns a prorated charge to each call based on the employee's rate plan.

In another exemplary embodiment, the present invention includes the ability for employees to interact with their invoice detail, over-riding the rules engine assignment in order to generate an employee specified categorization. The employee may specify all calls to a given number as personal or business or they may specify categories by individual calls.

In another exemplary embodiment, the present invention includes a tool having the capability to automate workflow. In this exemplary embodiment, the tool automates the workflow associated with a business submitting a reimbursement for personal use (usually when the business pays the service carrier for the total bill) or an employee submitting a reimbursement for business (usually when the employee pays the service carrier for the total bill). Also in this exemplary embodiment, a business or employee can submit a reimbursement and the tool will communicate with the business's computer (usually an accounts receivable or accounts payable application). In this exemplary embodiment, the tool can route reimbursement requests, such as through managers for additional approval and then route the workflow so that the right party gets paid the right amount. This tool automates a typically manual system and method, which typically includes time-consuming tasks, such as the hand delivery of paper receipt of bills with an attached, manually filled-in expense reimbursement form, to the employee's manager.

In another exemplary embodiment, the present invention enables corporate administrators and managers to electronically define cellular usage policies establishing business monetary or time limits as well as restrictions by area or country code. Policies may be defined for individuals or classes of individuals. In another exemplary embodiment, the present invention automatically tracks and reports on employee compliance vis-à-vis their defined usage policy.

In another exemplary embodiment, the present invention includes a system and method designed to equitably allocate costs in situations where businesses use a pool of minutes spread across a number of cell phone users. These costs can assist businesses to integrate reporting across departments in a manner to reflect actual phone usage of the pool rather than individual rate plan usage.

In another exemplary embodiment, the present invention includes a system and method designed to assist businesses in determining, across classes of employees, how particular types of employees (e.g., sales employees) use their phone services versus other types of employees (e.g., accounting employees).

In another exemplary embodiment, the present invention includes a system and method capable of displaying a cell phone user's calling history compiled by the numbers dialed offering a consolidated view of phone usage that can easily identify over use or abuse.

In another exemplary embodiment, the present invention includes a system and method capable of automatically allocating calling activity time and charges to specific phone numbers that correspond to billable clients of a business or to assign charges to a specific project or cost center.

These and other features of the present invention will be more readily apparent upon reading the following detailed description in conjunction with the accompanying drawings.

BRIEF DESCRIPTION OF THE DRAWINGS

FIGS. 1–8 are exemplary screen shots of an implementation of the present invention.

FIGS. 9 and 10 illustrate exemplary flow charts for categorizing calls and for applying rules in accordance with the present invention.

DETAILED DESCRIPTION OF THE INVENTION

Figure 11:
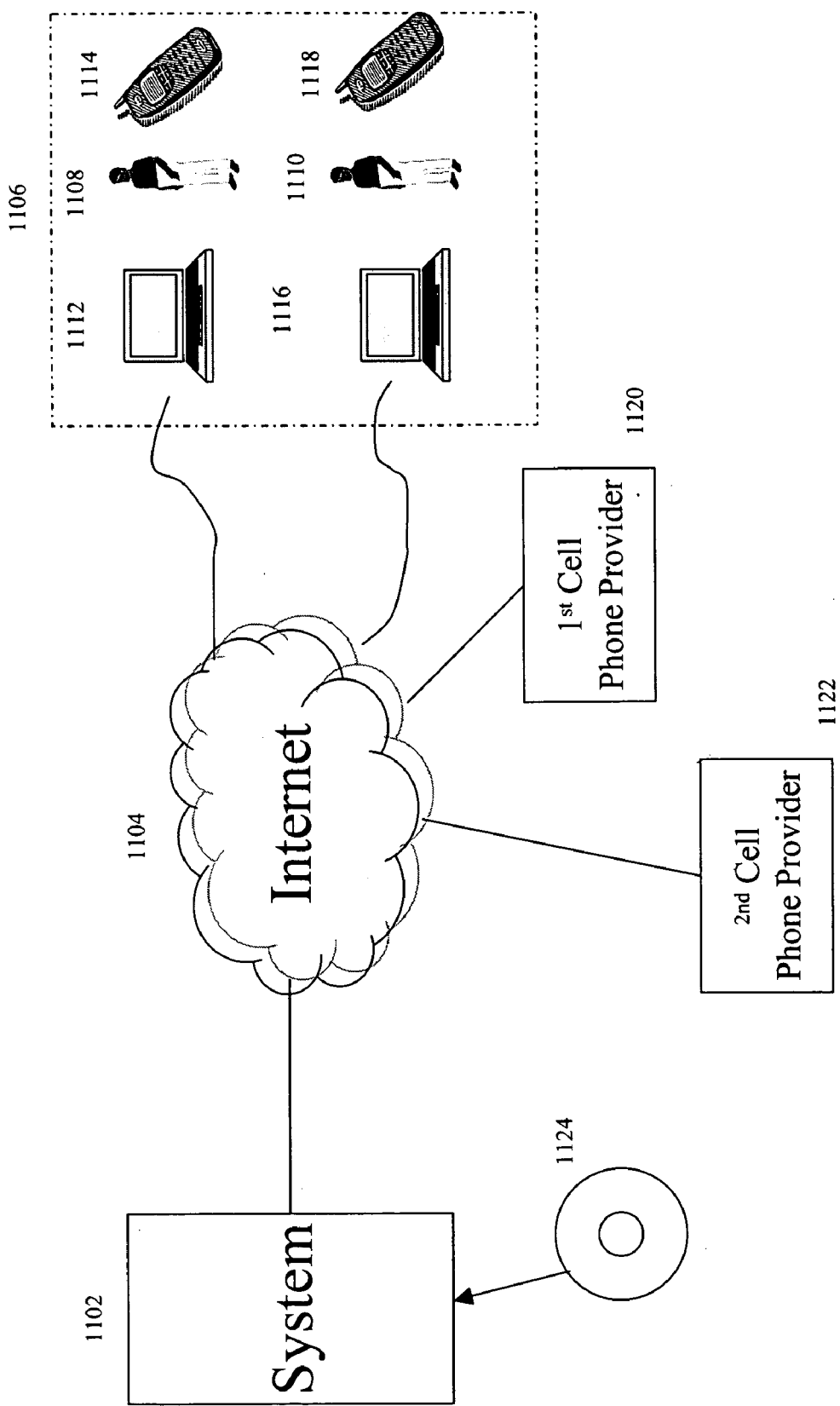
FIG. 11 depicts an overall system architecture in accordance with the present invention.

FIG. 11 shows an embodiment of the present invention. System 1102 is in communication with a network 1104. Preferably, network 1104 is a global communications network, for example, the Internet. A company 1106 and wireless telephone service providers 1120, 1122 are also preferably in communication with network 1104. Although company 1106 can include any number of employees, in the embodiment shown in FIG. 11, company 1106 includes two employees, a first employee 1108 and a second employee 1110. For clarity, first employee 1108 is associated with a first computer 112 and a first cellular telephone 1114, and second employee 1110 is associated with a second computer 1116 and a second cellular telephone 1118.

Service for first cellular telephone 1114 is provided by a first wireless telephone service provider 1120 and service for the second cellular telephone 1118 is provided by a second wireless telephone service provider 1122.

System 1102 receives information related to the usage and charges associated with employees of company 1106. Using embodiments of the present invention, those employees can perform many functions including review their cellular telephone bills or usage statements on-line, establish preferences, and change call designations. Managers of company 1106 can also perform many functions by interacting with system 1102. For example, managers can set preferences, establish policies governing the billing and/or reimbursement of cellular telephone calling traffic, create telephone directories designating business telephone numbers and personal telephone numbers, and managers can review the cellular telephone bills and/or usage by managed employees.

Generally, system 1102 provides a convenient way for companies to manage cellular telephone costs associated with cellular telephone usage by employees and to reduce some of the manual bookkeeping and payment workflow tasks associated with reconciling cellular telephone bills.

After an initialization process, where information is received from company 1106, system 1102 receives billing and usage information from various wireless service providers that provide wireless telephone services to employees of company 1106. Although any number of different wireless telephone service providers can provide service to company 1106, the embodiment shown in FIG. 11 shows two cellular telephone service providers, a first cellular telephone service provider 1120 and a second 1122. System 1102 can receive information from both of these cellular telephone service providers. In some embodiments, the cellular telephone service providers send information to system 1102 via an optical or magnetic disk 1124, in other embodiments, the cellular telephone service providers send the information electronically via a proprietary connection or via Internet 1104.

System 1102 receives the information and makes the information available for authorized users. In a preferred embodiment, system 1102 hosts a website that contains the information. First employee 1108 can use first computer 1112 to access the website and interact with the information. Similarly, second employee 1110 can use second computer 1116 to also interact with the information contained on the website.

An initialization process can be used when the system has no information related to the client (in the embodiment shown in FIG. 11, one example of a client is company 1106). A list of all of the cell phone users in the company is created within the system and each cell phone user has his own account that is password protected. Users can view details related to their business as well as their personal usage.

Users can create a phone book to which they can add business entries or personal entries. Employees can transfer information from a variety of sources, including their PalmPilots or other PDAs and send all of their address book entries to the system. This contacts information is loaded into their personal phone books. Users can then go through the entries and categorize them into business contacts or personal contacts. In this way, users can create their phone books.

The system also includes management hierarchy whereby the manager of a given employee goes through a process of creating a profile of authorized phone uses for business purposes. This can be done by either creating a new profile or selecting an existing profile and assigning it to that employee so that the parameters can be set in that profile.

The system may run on various computer systems. The system may interact with users in many manners apparent to one skilled in the art. Preferably the system will run on a business's equipment or on a server from which a business may interact with the system. In an exemplary embodiment, the system runs on a remote server accessible via the global internet.

Figure 1:
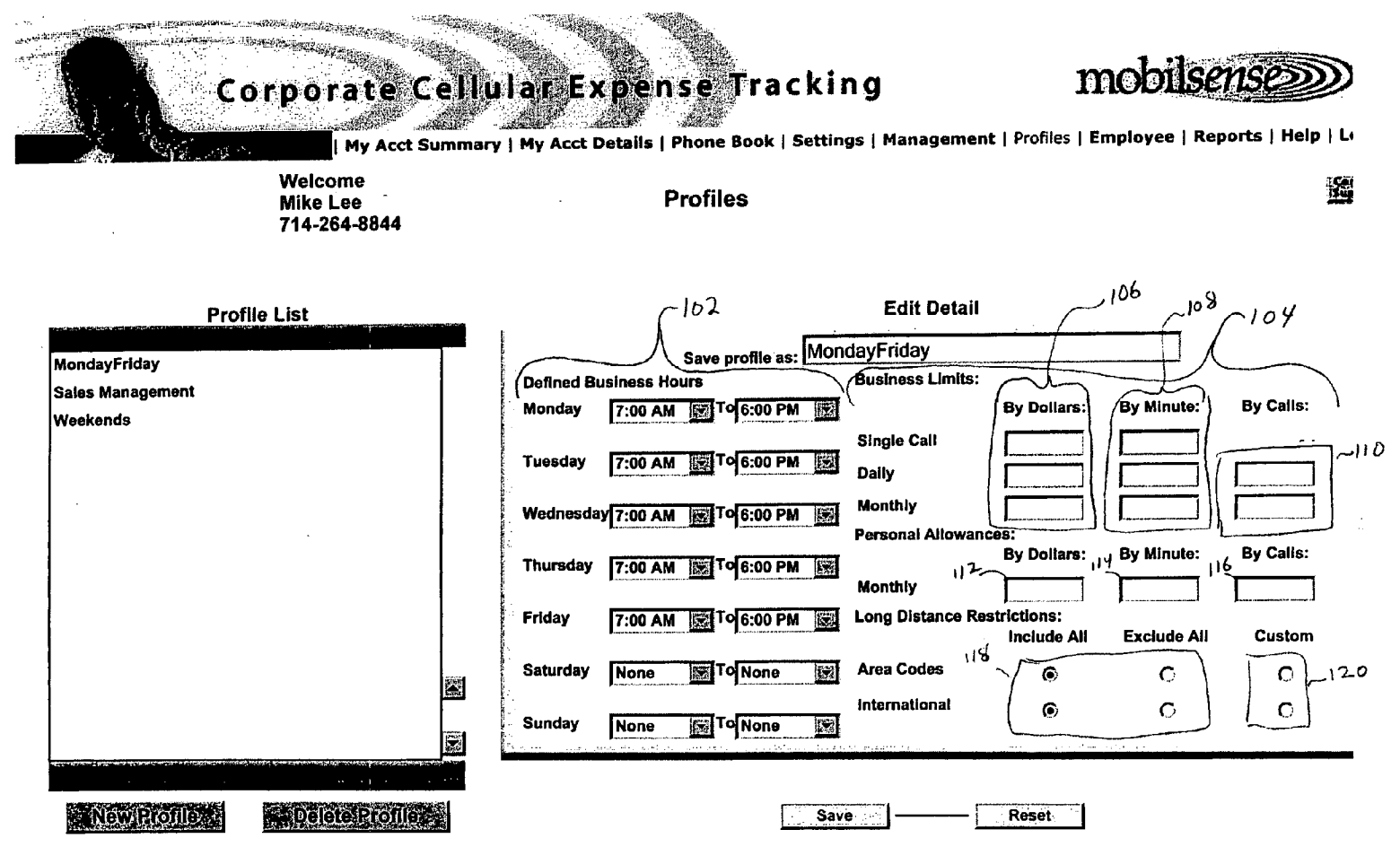

FIG. 1 is a preferred embodiment of a profile screen in accordance with the present invention. Preferably, the profile screen can be configured to allow a user to create a new profile, modify an existing profile, or delete a profile.

In an exemplary embodiment, a profile screen includes business hour boxes 102. In this embodiment, business hour boxes 102 are configured to allow a user to define business hours. Such business hours may be used to set a default, by which a business may default all calls made within business hours to be business calls.

As an example, if an employee makes a call between the hours of 7:00 a.m. and 7:00 p.m. and the system does have a default for the call, the system can set the call to a default, such as business. As another example, if an employee makes a call outside of 7:00 a.m. to 7:00 p.m., and the system does have a default for the call, the system can set the call to a default, such as personal.

So even though some calls may be categorized as personal usage, the employee may not be required to reimburse for those calls because it may fall within a personal usage allowance established via boxes 112, 114, or 116. Managers can preferably also establish a personal usage allowance, if desired.

After the call and billing records have been loaded into the system, an employee may then set his calendar to define vacation days and travel days. After this is done, the system evaluates each call against the rules that have been established either based on the profile set by the manager or by the action the employees' taken in his phonebook or his calendar to declare a number as being either personal or business.

Preferably, the profile screen can be configured to allow a user to create business limits. Such limits preferably constrain an employee's use of an applicable phone service by setting limits, such as limits to times, dollars, and numbers of calls after which an employee's use will be defaulted to be personal.

In an exemplary embodiment, a profile screen includes business limit boxes 104. In this embodiment, business limit boxes 104 are configured to allow a user to set business limits. Business limits may be used to constrain an employee's use of or reimbursement for the applicable phone service. In this embodiment, business limit boxes 104 include limits to the dollars (dollar limit 106), minutes (minutes limit 108), and number of calls (call limit 110). Business limits may be used by a business to reflect certain assumptions about when calls are or are not personal or business related. If a business sets any call over 15 minutes (through minute limit 108, in this embodiment) to default to being considered a personal call, then all calls made by an employee, without further information, may be defaulted to personal.

By way of example, minute limit 108 may be set to 750 minutes. If set to 750 minutes the system can permit an employee to use 750 minutes per month for business purposes. If the employee goes over that 750 minutes, the system can be set to require the employee to reimburse the business for all minutes over 750. A similar limit can be set for number of calls made during a time period by setting a number-of-calls limit through call limit 110.

Preferably, the profile screen can be configured to allow a user to create personal allowances as well. Such allowances preferably allow an employee some allowance to which a business will reimburse an employee for use of an applicable phone service, even if the employee did not make enough business calls to reach the allowance.

In the exemplary embodiment set forth in FIG. 1, the profile screen includes personal allowance boxes: dollar allowance 112, minute allowance 114, and call allowance 116. In this embodiment, a user (typically a phone administrator or manager) can set these allowances. Also in this exemplary embodiment, only a manager or other authorized business persons can change business hours, business limits, and personal allowances.

Preferably, the profile screen can be configured to allow a user to create long distance restrictions. Such long distance restrictions preferably set certain long distance calls for which a business will not reimburse an employee.

In an exemplary embodiment, the profile screen includes long distance restriction buttons 118. Long distance restriction buttons 118 may be configured, typically by a manager or authorized person, to set a default to include or exclude calls made based on the area code or country called. Also in this exemplary embodiment, the profile screen includes custom buttons 120. Custom buttons 120 may be set, and with additional input (not shown), certain area codes, and international country codes will not be defaulted to be personal and thus non-reimbursed, such as by the business setting up custom phone number lists, such as with all of the extensions of the company in such area code or country. Likewise, calls otherwise defaulted to be business through the profile screen may be set to personal.

FIG. 2 is a preferred embodiment of a phone book screen in accordance with the present invention.

Preferably, the phone book screen can be configured to allow a user to set particular phone numbers to be personal or business. In an exemplary embodiment, phone book screen includes a phone book list 202, an edit detail 204, an add new number 206, a delete number 208, and setting buttons 210. In this embodiment, phone book list 202 is capable of allowing a user to view phone numbers for which the system has set to be personal or business. Also in this embodiment, the phone book screen allows a user to add new numbers to phone book list 202 or delete numbers from phone book 202 through two buttons, add new number 206 and delete number 208. Also in this embodiment, the phone book screen includes setting buttons 210. Setting buttons 210 allow a user to set what types of phone numbers are listed by the system in phone book list 202, all, business numbers only, or personal numbers only. Also in this exemplary embodiment, the phone book screen includes edit detail 204. Edit detail 204 is configured to allow the user to change the details associated with a particular phone number, which is usually set forth in phone book list 202.

Figure 3:

FIG. 3 is a preferred embodiment of an account summary screen in accordance with the present invention. The account summary screen of FIG. 3 is generally used by employees but may also be viewed by managers or administrators.

The account summary screen can be selected on the left menu bar. Typically, this is the default screen given to users after they have logged in.

Preferably the account summary screen includes a summary of the calls made during a month by an employee, and how those chargers are allocated to personal or business purpose. Also preferably, how such calls are allocated to personal or business is through policy (as set forth in part in the profiles screen in FIG. 1) and through employee choice (as set forth in part in the phone book screen, FIG. 2). Preferably, as profiles become more and more accurate at defaulting calls to personal and business use (typically through experience and iteration), and employees set more and more calls to be personal or business (such as through edit detail 204 of FIG. 2), most calls will be correctly allocated. An example of allocated calls is set forth in a current month allocation box 302. This box 302 sets forth personal calls 304 and business calls 306. How the calls were allocated to personal or business is shown by there being set through policy, policy based 308 and 310, and through the employee specified, 312 and 314.

Figure 10:
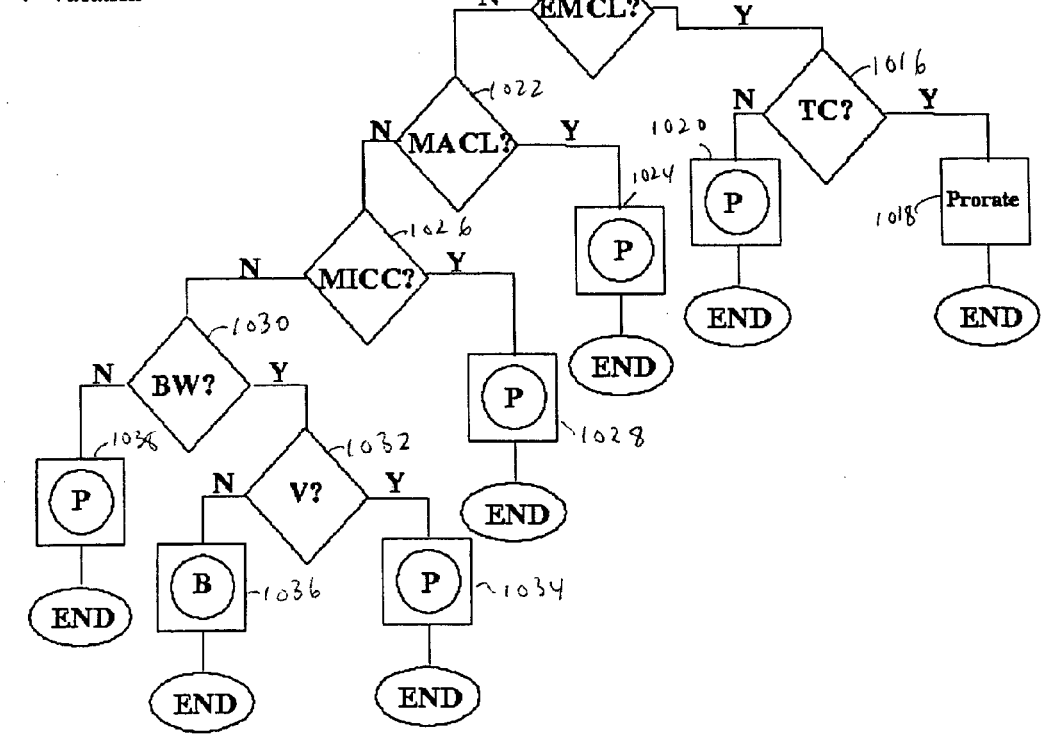

As will be shown in part in FIGS. 9 and 10, profiles set can be used to further refine when a call is personal or business.

In the exemplary embodiment set forth in monthly allocation box 302, there are 42 personal calls to 18 numbers for 98 total minutes. The total charge allocated to such personal calls is $14.10.

Preferably, the account summary screen is configured to allow the user to link to the profiles and other policies that are used to set calls to be personal or business by clicking on policy based 308 or policy based 310. Also preferably, the account summary screen is configured to allow the user to link to the employee choices that are used to set calls to be personal or business by clicking on employee specified 312 or 314.

The account summary screen, FIG. 3, also preferably includes a summary region 316. Summary region 316 preferably sets forth an employee's monthly access fees, taxes for the month, plan minutes assigned, plan minutes used, minutes over/under, unallocated fees/credits, and equipment charges (a new phone, battery, etc.). Summary region 316 can be used to help a business assess what the used minutes cost as well as what the unused minutes cost.

The account summary screen, FIG. 3, also preferably includes a profile summary region 318. Profile summary region 318 preferably sets forth an employee's profile, such as personal allowance, business limits, and etc.

The account summary screen also preferably includes a calendar 320. Calendar 320 preferably sets forth an employee's calendar. Calendar 320 can be set to adjust the profiles used to set when calls are personal or business. Thus, if an employee sets three days to be business travel, all personal calls would be overridden to business during those three days. Similarly, if an employee sets five days for vacation, all calls made during those vacation days would be set to personal.

Figure 4:

FIG. 4 is a preferred embodiment of a "my account details" screen in accordance with the present invention. The my account details screen of FIG. 4 is generally used by employees but may also be viewed by managers or administrators. The my account details screen can be selected on the left menu bar. The my account details screen sets forth details regarding a particular employee's account.

Preferably the my account details screen includes a called number list 402 and an individual call section 404. Called number list 402 preferably sets forth a list, either of all calls made during a time-period (set through time-period 406), all personal calls, all business calls, or all mixed-category calls, but may be set to show any calls as-requested by a user. These calls are grouped and displayed by the number dialed to facilitate the identification of high use or abuse.

Preferably individual call section 404 is configured to set forth all calls to a particular phone number, area code, or country. Individual call section 404 preferably also sets forth how each call is categorized: business, personal, or otherwise (set forth in part through category buttons 408) and the selection criteria used to determine the category (shown, in this embodiment by "time-of-day", at a selection criteria 410).

In an exemplary embodiment, the my account details screen sets forth a call detail section, preferably where individual call section 404 is currently set forth. This call detail section preferably is configured to show whatever is selected by the user from called number list 402, but in greater detail or grouped differently than in called number list 402. For example, if the user clicks on "Irvine" from called number list 402, the call detail section (not shown) will show all instances of this call to Irvine.

In another exemplary embodiment, the call detail section shows calls labeled "incoming" in called number list 402. The call detail section preferably then shows all incoming calls made within a time-period set within time-period 406.

Called number list 402 preferably sets forth a list, either of all calls made during a time-period (set through time-period 406), all personal calls, all business calls, or all mixed-category calls, but may be set to show any calls as-requested by a user.

In the exemplary embodiment set forth in FIG. 4, called number list 402 includes a category list 412 and a phone book list 414. Category list 412 sets forth the current setting for each call: business, personal, or mixed. Phone book list 414 sets forth which phone book each call is in, if any. If not in a phone book, the word "add" appears. Preferably called number list 402 is configured to link the user to a screen allowing the user to add the phone number to the business phone book or a personal phone book. For example, the user could click the "add" link in phone book list 414 to get to a screen to add "415-836-1163" to phone numbers in the business or personal phone book, thereby changing that number to a personal or business number. The user could also do the same for all numbers to or from area code "415". By so doing, the employee may be changing a number categorized as business or personal by the profiles to another category, which would then be categorized through an employee and thus would be "employee-specified."

FIG. 5 is a preferred embodiment of a phone book screen in accordance with the present invention.

Preferably, the phone book screen can be configured to allow a user or manager to set particular phone numbers to be business. In this embodiment, a phone book list 502 is capable of allowing a user to view phone numbers for which the system has set to be personal or business. Also in this embodiment, the phone book screen allows a user to add new numbers to phone book list 502 or delete numbers from phone book 502 through two buttons, add number 504 and delete number 506. Also in this exemplary embodiment, the phone book screen includes edit detail 508. Edit detail 508 is configured to allow the user to change the details associated with a particular phone number, which is usually set forth in phone book list 502.

In another exemplary embodiment, the system allows a user to add and delete phone numbers and/or all numbers having a certain area code from a business phonebook. In the embodiment set forth in FIG. 5, the user can make changes to the business phonebook. In another exemplary embodiment, a business phonebook edit screen (not shown) allows a user (but typically a manager) to make broader changes to the business phonebook, such as making all numbers having a certain area code default to business.

Preferably, the business phonebook can be business-wide or applicable to various divisions and departments of the business. In an exemplary embodiment, the business phonebook is business-wide so that all numbers, once set (such as by entry or profile) are categorized as a business call for every employee of the business.

FIG. 6 is a preferred embodiment of an employee screen in accordance with the present invention. The employee screen of FIG. 6 is generally used by managers to establish an employees' manager, cost center and profile assignment.

Preferably the employee screen includes an employee list 602, an edit detail list 604, and a manager selection list 606. Manager selection list 606 is preferably configured to allow a user to search through all managers or other authorized persons, and select a name, such as "Mike Lee." Also preferably, employee list 602 is configured to show all employees working under the person selected through manger selection list 606. In this exemplary embodiment, employee list 602 shows four employees who are under Mike Lee's supervision.

Preferably employee list 602 is configured to allow the user to select an employee listed in employee list 602 to be detailed in edit detail 604. Edit detail 604 is preferably configured to allow the user to change certain information related to the selected employee, such as name, phone number, company, division, department, employment, email address, manager's name, and profile.

FIG. 7 is a preferred embodiment of a manager screen in accordance with the present invention. The manager screen of FIG. 7 is generally used by managers to analyze and approve or disapprove of employees' phone usage.

Preferably the manager screen includes a managed employee list 702, an employee summary statement 704, and a manager selection box 706. Manager selection box 706 is preferably configured to allow a user to search through all managers or other authorized persons, and select a name, such as "Mike Lee." Also preferably, managed employee list 702 is configured to show all employees who work under the person selected through manager selection box 706. In this exemplary embodiment, employee list 602 shows four employees who are under Mike Lee's supervision.

Preferably managed employee list 702 includes a status list 708. Status list 708 preferably informs the viewer as to whether or not relevant employee has viewed his or her phone statement. In an exemplary embodiment, status list 708 sets forth that employee "Abramson, Cynthia" has viewed her phone statement, but that "Corry, Erin," "Grant, Timothy," and "Winterthorpe, George" have not.

Preferably managed employee list 702 includes an edit list 710. Edit list 710 preferably allows a user, by clicking on an appropriate edit button, to see a summary or detail statement for an employee, such as is set forth in employee summary statement 704.

In an exemplary embodiment, once the manager (here, Mike Lee) has approved by checking the appropriate box in an approve list 712 (or all by checking a select all button 716), the manager may submit all approved employee from managed employee list 702 for processing. Preferably the management screen allows the manager to submit approved employee phone statements through clicking a button, such as a submit for processing button 714.

The present invention is also directed to an application that is capable of assisting with workflow design (similar to project management) and is also capable of assisting in analyzing jobs and workflow.

Once the phone statement has been processed, the system preferably is configured to automatically reimburse the employee or business, as appropriate. This automatic reimbursement includes a process, called "accounts payable automated workflow," or "workflow" for short.

To perform this workflow process, the system preferably is configured to receive an employee's and a business's account information. This account information preferably includes an account or accounts for each employee and the business that are capable of having money taken out or put in via electronic funds transfer. In an exemplary embodiment, this account information includes an employee's credit card account for reimbursing the business and checking account for being reimbursed by the business. Also in this exemplary embodiment, this account information includes the business's accounts payable account for reimbursing employees and accounts receivable account for receiving reimbursements from employees.

With the accounts information, the system preferably is configured to communicate with the various companies or business software that manage the accounts. By so communicating, preferably the system can request that the appropriate reimbursement be made to the employee or business, as appropriate. Such reimbursement amounts are preferably equal to those determined by processing phone statements.

By way of example, assume John Doe is determined by the system to need to reimburse the business for his personal use of a phone for $13.72. If the system received his credit card account as the account from which he wishes to reimburse the business, the system will request from the credit card company a payment to the business's account (such as its accounts receivable account) of $13.72. The system typically does so once John Doe and his manager have submitted John Doe's statement for processing and the system has determined the appropriate reimbursement amount.

Use of the system, does not, however, necessitate reimbursement of amounts determined to be reimbursable. Businesses may choose to use the system to manage phone usage without necessitating reimbursement. In such cases, businesses generally use the system to audit phone usage rather than process reimbursements.

In an exemplary embodiment (not shown), managed employee list 702 includes four buttons for each employee listed. One button indicates whether or not the employee is a manager. Another button indicates whether or not the employee is an administrator. Another button indicates whether or not the employee pays his or her own phone bill, and so will only be reimbursed by the business. The last button indicates whether or not the business pays the employee's phone bill and the employee reimburses the business. Based upon the criteria indicated by the buttons, the employee has or does not have certain manager and/or administrator rights, and either reimburses the business or is reimbursed by the business.

In the preferred embodiment set forth in FIG. 7, statement summary 704 sets forth a summary of various actions made by the employee. The summary in statement summary 704 can include information analyzing the original total charges for personal and business calls. Further, it can set forth to what degree the charges were adjusted by the employee (such as by an employee-specified change). Preferably statement summary 704 sets forth the type of override (such as by an employee-specified change) made by the employee: travel, vacation, and other. Also preferably, statement summary 704 sets forth the net and percent change due to the employee's overrides. With this information and a new total, summary statement 704 provides valuable information for the employee's manager to determine if the employee's phone statement is correct and if the reimbursement amounts are correct. In an exemplary embodiment, the system alerts the manager when an employee overrides charges too often or by too high an amount, such as through an alert when an employee consistently overrides more than half of their personal calls to be business calls.

As set forth in greater detail in FIGS. 9 and 10 and the accompanying description, the original totals for personal and business calls are preferably determined through the use of a rules engine.

Also preferably, the present invention is configured to allow a manager's manager to alter profiles and individual phone statements under the manager's supervision.

FIG. 8 is a preferred embodiment of a management reports screen in accordance with the present invention. The management reports screen of FIG. 8 is generally used by managers to analyze employees' phone usage across various carriers, companies, divisions, and departments.

Preferably the management reports screen includes a date field 802, a reports field 804, and a current report 806.

Reports field 804 includes options of "individual detail," "summary average by user," and "summary with totals," among other reports (not shown). Also, if a user selects an option through reports field 804, the corresponding report will be set forth in current report 806.

In the preferred embodiment set forth in part in FIG. 8, the option is "individual detail" and the report shown in current report 806 is directed to details of various individual employees. In the exemplary embodiment set forth in part in FIG. 8, the report sets forth an employee's names 808, carrier 810, total charge 812, airtime charges 814, roaming charges 816, long distance charges 818, UCPM charges 820, total minutes 822, minutes over/under 824, and plan type 826. The report also sets forth each listed employee's manager 834, department 832, division 830, and company 828.

The manager 834, department 832, division 830, and company 828 fields are preferably provided by the business or employee when the system is initially set up.

The individual report set forth in current report 806, assists managers' and businesses' analysis of costs and phone usage across multiple criteria. Thus, a manager can analyze how a particular department's costs and phone usage compares to another department, and so forth. Also, the individual report allows a business to analyze the costs and usage of all the carriers, thereby assisting the business in determining which carrier is superior, which is overcharging, and etc. Also, the business or manager can use this report to assist in understanding employees' cost per minute and how to optimize the different available rate plans based on employees' usage. Also, the business or manager has a single, unified tool to manage phone usage.

FIG. 9 is a preferred embodiment of a rules engine in accordance with the present invention. The rules engine preferably follows certain profiles, employee-specified entries, and business-specified entries to determine how to categorize phone calls, typically into personal or business categories.

The rules engine preferably receives records from one or more sources. These records preferably include calls made, when made, to which number made or received by, and by which employee.

Once these records are received by the rules engine, the rules engine preferably applies the rules to each call. These rules preferably include profiles and entries received from the business and/or employee.

In an exemplary embodiment, set forth in part in FIG. 9, the rules engine looks at the number that was called or from which the call was received by the employee (the call number). First, the rules engine attempts to match the call number to a personal phonebook entry, step 902. If it matches, the rules engine continues to step 904. If it does not, it continues to step 914.

In step 904 the rules engine attempts to match the call number to a personal phonebook entry. If it does, the rules engine continues to step 916. If it does not, it continues to step 906.

In step 906, the rules engine attempts to match the call number to a business travel day. If it does, the rules engine continues to step 908. If it does not, it marks the call number as personal according to step 912.

In step 908, the rules engine attempts to match the call number to a business travel flag. If it does, the rules engine marks the call number as business according to step 910. If it does not, it marks the call number as personal according to step 912.

In step 914 the rules engine attempts to match the call number to a corporate phonebook entry. If it does, the rules engine continues to step 924. If it does not, it continues to step 930 (set forth in FIG. 10).

In step 924 the rules engine attempts to match the call number to a personal phonebook entry. If it does, the rules engine continues to step 926, marking the call number as personal. If it does not, it continues to step 928, marking the call number as business.

In step 916 the rules engine attempts to match the call number to a corporate phonebook entry. If it does, the rules engine continues to step 920, marking the call number as personal. If it does not, it continues to step 918, marking the call number as business.

FIG. 10 is a preferred embodiment of a policy engine in accordance with the present invention. The policy engine preferably follows certain limits and employee-specified or business-specified entries to determine how to categorize phone calls, typically into personal or business categories.

The policy engine preferably attempts to match call numbers for which the rules engine, set forth in part in FIG. 9, is unable to categorize.

The policy engine preferable receives call numbers and other details from the rules engine. The policy engine preferably receives limits and entries received from the business (typically all of the limits) and/or employee.

In an exemplary embodiment, set forth in part in FIG. 10, the policy engine looks at the call and call number. First, the policy engine attempts to determine if the call exceeds the single call limit according to step 1002. If it does, the policy engine continues to step 1004, prorating the cost of the call. If it does not, it continues to step 1006.

In step 1006, the policy engine attempts to determine if the call exceeds the daily call limit. If it does, the policy engine continues to step 1008. If it does not, it continues to step 1014.

In step 1008, the policy engine attempts to determine if the call is a transitional call. If it is, the policy engine continues to step 1010, prorating the cost of the call. If it does not, it continues to step 1012, marking the call personal.

In step 1014, the policy engine attempts to determine if the call exceeds the monthly call limit. If it does, the policy engine continues to step 1016. If it does not, it continues to step 1022.

In step 1016, the policy engine attempts to determine if the call is a transitional call. If it is, the policy engine continues to step 1018, prorating the cost of the call. If it does not, it continues to step 1020, marking the call personal.

In step 1022, the policy engine attempts to determine if the call number matches an area code limit. If it does, the policy engine continues to step 1024, marking the call personal. If it does not, it continues to step 1026.

In step 1026, the policy engine attempts to determine if the call number matches an international call limit. If it does, the policy engine continues to step 1028, marking the call personal. If it does not, it continues to step 1030.

In step 1030, the policy engine attempts to determine if the call was made during business hours. If it was, the policy engine continues to step 1032. If it does not, it continues to step 1038.

In step 1032, the policy engine attempts to determine if the call was made during vacation time. If it was, the policy engine continues to step 1034, marking the call personal. If it does not, it continues to step 1036, marking the call business.

In step 1038, the policy engine attempts to determine if the call was made during business travel. If it was, the policy engine continues to step 1040, marking the call business. If it does not, it continues to step 1042, marking the call personal.

Preferably the rules and policy engines continually receive changes made to limits, entries, and profiles. By so doing, the rules engine and policy engine become more and more accurate at categorizing calls. Also by so doing, the system requires, as a general rule, less and less input and interaction with the business and employees, saving the business time and productivity.

A utilization process can be used when the system receives information from a telephone service carrier in a carrier-specific format. Information received from carriers generally is related to billing statements, phone usage, and other phone-related information. To make best use of this information, especially in cases where information is received from multiple carriers, the system converts the information from the carrier-specific format to a common format.

Preferably the information received from the carriers includes rate plans and is correctly described so that the system can best determine how to account for calls and attribute costs to particular calls.

Figure 12:
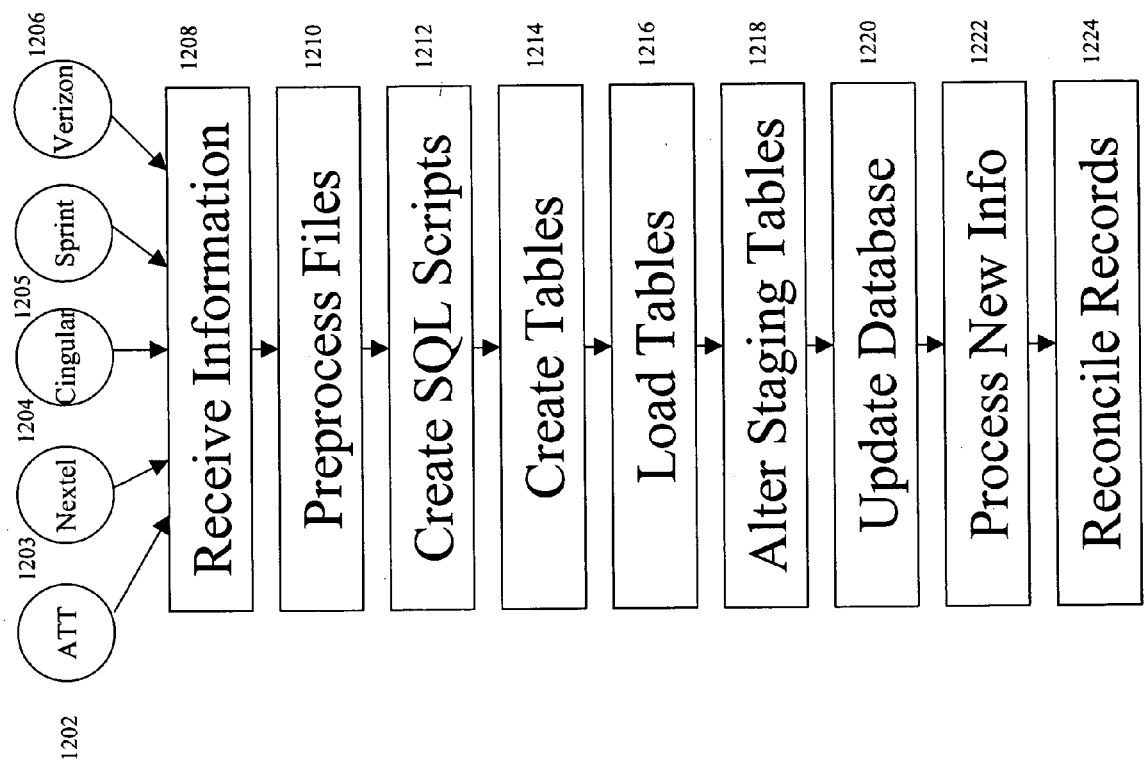
FIG. 12 illustrates an exemplary method by which carrier-specific information is converted into a common format.

FIG. 12 sets forth, in part, a method whereby carrier-specific information is converted into a common format.

In step 1208, the system receives information from the carriers. Preferably this information is provided routinely. Also preferably, this information is received by the system on a computer disc, other tangible media, or electronically. In an exemplary embodiment, the system receives information from carriers monthly and, e.g., on computer discs 1202–1206.

In step 1210, the system preprocesses the information from the carriers (the "files"). Preferably, the preprocess step converts the files into a format suitable for loading into the system.

In step 1212, the system creates SQL scripts. Preferably, the system creates SQL scripts that will provide staging tables to receive the information from the preprocessed files. Also preferably, the structure of each table will match the structure of the corresponding preprocessed file.

In step 1214, the system creates tables in a database. Preferably these tables are capable of receiving information.

In step 1216, the system loads the tables with the information. Preferably, the system also verifies that the number of rows of data in each file matches the number of rows that are loaded into the staging table.

In step 1218, the system alters the staging tables to include new columns corresponding to field and tables based on the common format, and populates those new columns with the data. To perform this step, preferably the system can access the number and type of fields received from the carrier in order to best translate those fields into the common fields.

In step 1220, the system updates and inserts the tables into a database that is in the common format.

In step 1222, the system processes the newly received information to determine the category of calls made. Preferably, the information received includes call detail records (CDRs). In an exemplary embodiment, the system processes the newly received information by executing a rule engine, as set forth in greater detail above.

In step 1224, the system reconciles newly received information with a summary statement of the information.

While these steps generally are followed, in some instances an error may occur. If an error occurs, preferably the system will continue to convert information not associated with the error from a carrier-specific format to a common format. Also preferably, the system will log errors.

Attached as Appendix 1 are help sheets for (1) My Account Details; (2) Employee; (3) Management; (4) Phone Book; (5) Profiles; (6) Reports; and (7) Account Summary. The help sheets provide additional information and instructions regarding use of the system.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for managing telephone accounts, comprising:
   means for receiving billing and usage information from at least one wireless telephone service provider related to a plurality of wireless telephone service users, the users being permitted to use the wireless telephone service for both business and personal activities, the billing and usage information comprising billing and usage data for the business and personal activities;
   means for distinguishing between business and personal activities included in the billing and usage data, said means for distinguishing comprising a rules engine operable to identify business activity and personal activity based on at least one of a preset phone book entry, time of day, day, and area code and country called associated with a given call instance, said means for distinguishing further designating each activity as one of a business activity and a personal activity;
   means for allowing the users and managers of the users to view the thus-designated business activities and personal activities on a display and for allowing the users and managers to modify and re-designate a given activity;
   means for associating a predetermined charge to each of the activities; and
   means for approving the activities and associated charges such that a total cost of business and personal activities is allocated according to a predetermined policy.

2. The system of claim 1, wherein the billing and usage information is received via at least one of an electronic network, an optical disk and magnetic disk.

3. The system of claim 1, wherein the means for distinguishing is operable to receive user input.

4. The system of claim 1, wherein the means for distinguishing can be overridden.

5. The system of claim 1, further comprising means for automating a workflow to obtain approval of the activities and associated charges.

6. The system of claim 1, wherein the means for allowing to view and the means for allowing to modify comprises a website accessible via a network.

7. The system of claim 1, further comprising a user interface that is operable to display at least one of a user profile, a phone book, an account summary, account details, a listing of users and management reports.

8. A computer implemented method of allocating costs of wireless telephone usage, the method comprising:
   receiving billing and usage information from at least one wireless telephone service provider related to a plurality of wireless telephone service users, the billing and usage information comprising billing and usage data that combines business and personal calls made by the respective users;
   for each call in the billing and usage data, automatically categorizing the call as a business call or a personal call, the step of categorizing comprising distinguishing between business and personal calls based on at least one of a preset phone book entry, time of day, day, and area code and country called associated with a given call instance;

reviewing categorized calls via a graphical user interface and modifying a categorization of at least one of the calls previously categorized; and approving, via the graphical user interface, a final categorization of the calls.

9. The method of claim 8, further comprising receiving the billing and usage information via at least one of an electronic network, an optical disk and magnetic disk.

10. The method of claim 8, further comprising automating the step of approving.

11. The method of claim 8, further comprising accessing a website to view categorized calls.

12. The method of claim 8, further comprising displaying, via the graphical user interface, at least one of a user profile, a phone book, an account summary, account details, a listing of users and management reports.

13. The method of claim 8, further comprising automatically allocating call charges to individual users based on actual time used from a pool of time made available to a plurality of users.

14. The method of claim 13, further comprising allocating call charges to a department to which a user is assigned.

15. The method of claim 13, further comprising charging a pro-rated amount based on time used from the pool of time.

16. The method of claim 8, further comprising applying a usage policy to the billing and usage information.

17. The method of claim 16, further comprising automatically determining compliance with the usage policy.

18. A computer implemented method of monitoring and managing wireless telephone call usage, comprising:

defining a set of policies that cause a given telephone call to be categorized as a business call or a personal call, said policies being stored in a computer program operable to apply the policies upon request;

receiving data indicative of wireless telephone usage, the usage comprising both business wireless telephone call usage and personal wireless telephone call usage;

attempting to categorize each wireless telephone call based on at least one of a preset phone book entry, time of day, day, and area code and country called associated with a given call instance; and for calls that cannot be categorized based on the at least one of a preset phone book entry, time of day, day, and area code and country called associated with a given call instance, applying the policies to categorize the calls.

19. The method of claim 18, further comprising providing a graphical user interface via which categorized calls, related charges, and users can be viewed and managed, by viewing the total activity summarized by telephone number dialed.

20. The method of claim 18, further comprising at least one of automatically charging users for personal calls and automatically reimbursing users for business calls.

21. The method of claim 18, further comprising overriding a given call categorization.

22. The method of claim 18, further comprising approving call categorization and related charges.

23. The method of claim 18, further comprising allocating call charges to individual users based on actual minutes used from a pool of minutes made available to a plurality of users.

24. The method of claim 23, further comprising charging a pro-rated amount based on minutes used from the pool of minutes.

25. The method of claim 18, further comprising automatically allocating to a business client charges incurred in a call to that business client, based at least in part on a telephone number associated with the business client.

26. The method of claim 18, further comprising automatically determining compliance with the policies.

\* \* \* \* \*